United States Patent
Imanari et al.

(10) Patent No.: US 9,023,524 B2
(45) Date of Patent: May 5, 2015

(54) LITHIUM MIXED METAL OXIDE AND POSITIVE ELECTRODE ACTIVE MATERIAL

(75) Inventors: Yuichiro Imanari, Tsukuba (JP); Cedric Pitteloud, Muttenz (CH)

(73) Assignee: Sumitomo Chemical Company, Limted, Tokyo (JP)

( * ) Notice: Subject to any disclaimer, the term of this patent is extended or adjusted under 35 U.S.C. 154(b) by 670 days.

(21) Appl. No.: 13/202,822

(22) PCT Filed: Feb. 4, 2010

(86) PCT No.: PCT/JP2010/051588
§ 371 (c)(1),
(2), (4) Date: Aug. 23, 2011

(87) PCT Pub. No.: WO2010/098187
PCT Pub. Date: Sep. 2, 2010

(65) Prior Publication Data
US 2011/0305939 A1    Dec. 15, 2011

(30) Foreign Application Priority Data

Feb. 27, 2009 (JP) ................................. 2009-045610
Sep. 9, 2009 (JP) ................................. 2009-207966

(51) Int. Cl.
| | |
|---|---|
| *H01M 4/13* | (2010.01) |
| *H01M 4/505* | (2010.01) |
| *C01G 53/00* | (2006.01) |
| *H01M 2/16* | (2006.01) |
| *H01M 4/525* | (2010.01) |
| *H01M 10/052* | (2010.01) |
| *H01M 4/02* | (2006.01) |

(52) U.S. Cl.
CPC ............ *H01M 4/505* (2013.01); *C01G 53/006* (2013.01); *C01P 2004/62* (2013.01); *C01P 2006/40* (2013.01); *H01M 2/1686* (2013.01); *H01M 4/525* (2013.01); *H01M 10/052* (2013.01); *H01M 2004/021* (2013.01); *Y02E 60/122* (2013.01); *C01G 53/50* (2013.01); *C01P 2002/54* (2013.01); *C01P 2002/76* (2013.01); *C01P 2006/12* (2013.01)

(58) Field of Classification Search
CPC .... H01M 4/505; H01M 4/525; H01M 2/1686
USPC ................... 429/223, 221, 224, 218.1, 231.95
See application file for complete search history.

(56) References Cited

U.S. PATENT DOCUMENTS

| | | |
|---|---|---|
| 6,352,794 B1 | 3/2002 | Nakanishi et al. |
| 2005/0158546 A1 | 7/2005 | Shizuka |
| 2008/0182169 A1 | 7/2008 | Shizuka |
| 2008/0248390 A1 | 10/2008 | Yada et al. |
| 2011/0111280 A1 | 5/2011 | Tamakoshi et al. |

FOREIGN PATENT DOCUMENTS

| | | |
|---|---|---|
| CN | 1698223 A | 11/2005 |
| CN | 1870330 A | 11/2006 |
| CN | 101167209 A | 4/2008 |
| CN | 101364643 A | 2/2009 |
| EP | 1372202 A1 | 12/2003 |
| EP | 1876664 A1 | 1/2008 |
| JP | 2000-195516 A | 7/2000 |
| JP | 2004-002141 A | 1/2004 |
| JP | 2005-008461 A | 1/2005 |
| JP | 2005-336004 A | 12/2005 |
| JP | 2006-134816 A | 5/2006 |
| JP | 2008-235150 A | 10/2008 |
| JP | 2009-032682 A | 2/2009 |
| WO | 02/073718 A1 | 9/2002 |

OTHER PUBLICATIONS

First Office Action issued Jun. 8, 2013 in Chinese Patent Application No. 201080009336.4 to Sumitomo Chemical Co., Ltd., with English translation.
Second Office Action issued Jan. 2014 in corresponding Chinese Patent Application No. 201080009336.4 with English translation.
Office Action issued Oct. 15, 2013 in corresponding Japanese Patent Application No. 2009-207966 with English translation.
Third Office Action issued Jul. 17, 2014 in corresponding Chinese Patent Application No. 201080009336.4 with English translation.

*Primary Examiner* — Helen O Conley
(74) *Attorney, Agent, or Firm* — Sughrue Mion, PLLC

(57) ABSTRACT

Disclosed is a lithium mixed metal oxide which is useful for a positive electrode active material that is capable of providing a nonaqueous electrolyte secondary battery having more excellent cycle characteristics, in particular, more excellent cycle characteristics during high-temperature operation at 60 DEG C. or the like. Specifically disclosed is a lithium mixed metal oxide represented by the following formula (A). $Li_x(Mn_{1-y-z}Ni_yFe_z)O_2$ (A) (In the formula, x is not less than 0.9 and not more than 1.3; y is 0.46 or more and less than 0.5; and z is 0 or more and less than 0.1.) Also disclosed are: a positive electrode active material which comprises the lithium mixed metal oxide; a positive electrode which comprises the positive electrode active material; and a nonaqueous electrolyte secondary battery which comprises the positive electrode.

9 Claims, No Drawings

LITHIUM MIXED METAL OXIDE AND POSITIVE ELECTRODE ACTIVE MATERIAL

CROSS REFERENCE TO RELATED APPLICATIONS

This application is a National Stage of International Application No. PCT/JP2010/051588, filed on Feb. 4, 2010, which claims priority from Japanese Patent Application Nos. 2009-045610, filed on Feb. 27, 2009 and JP 2009-207966, filed Sept. 9, 2009, the contents of all of which are incorporated herein by reference in their entirety.

TECHNICAL FIELD

The present invention relates to a lithium mixed metal oxide. Specifically, it relates to a lithium mixed metal oxide, which is used as a positive electrode active material for a nonaqueous electrolyte secondary battery.

BACKGROUND ART

A lithium mixed metal oxide is used as a positive electrode active material for a nonaqueous electrolyte secondary battery such as a lithium secondary battery. The lithium secondary battery has already been in practical use as a power source for a cell phone, a notebook-size personal computer, or the like, and furthermore its application has been tried also in medium- to large-sized uses such as automobile use and power storage use.

As the conventional lithium mixed metal oxide, $Li(Mn_{0.1}Ni_{0.45}Fe_{0.45})O_2$ is concretely disclosed in Patent Document 1.

PRIOR ART DOCUMENT

Patent Document

Patent Document 1: JP-A-2000-195516

SUMMARY OF THE INVENTION

Problem to be Solved by the Invention

However, the nonaqueous electrolyte secondary battery which is obtained using as a positive electrode active material the lithium mixed metal oxide as stated above, can be hardly said to be sufficient in cycle characteristics, particularly, cycle characteristics during high temperature operation at 60° C. or the like. The purpose of the present invention resides in providing a lithium mixed metal oxide useful for a positive electrode active material capable of giving a nonaqueous electrolyte secondary battery that is more excellent in cycle characteristics, particularly, cycle characteristics during high temperature operation at 60° C. or the like.

Means for Solving the Problem

The present inventors have carried out various studies in view of the above situation, and accordingly have found that the undermentioned inventions satisfy the above purpose, and thus have led to the present invention.

That is, the present invention provides the following inventions.

<1> A lithium mixed metal oxide represented by the following formula (A):

$$Li_x(Mn_{1-y-z}Ni_yFe_z)O_2 \quad (A)$$

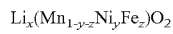

wherein x is a value in the range of not less than 0.9 and not more than 1.3, y is a value in the range of not less than 0.46 and less than 0.5, and z is a value in the range of not less than 0 and less than 0.1.

<2> The lithium mixed metal oxide according to the above item <1>, wherein the value of (1-y-z) is larger than that of y in said formula (A).

<3> The lithium mixed metal oxide according to the above item <1> or <2>, wherein z is a value in the range of not less than 0.02 and not more than 0.07 in said formula (A).

<4> The lithium mixed metal oxide according to any one of the above items <1> to <3>, wherein a mean value of particle diameters of constituent primary particles is in the range of not less than 0.01 μm and not more than 0.5 μm.

<5> A positive electrode active material comprising the lithium mixed metal oxide according to any one of the above items <1> to <4>.

<6> A positive electrode comprising the positive electrode active material according to the above item <5>.

<7> A nonaqueous electrolyte secondary battery comprising the positive electrode according to the above item <6>.

<8> The nonaqueous electrolyte secondary battery according to the above item <7>, which further comprises a separator.

<9> The nonaqueous electrolyte secondary battery according to the above item <8>, wherein the separator is a separator comprising a laminated film which has a heat-resistant porous layer and a porous film laminated to each other.

Advantages of the Invention

The present invention can provide a nonaqueous electrolyte secondary battery that is more excellent in cycle characteristics, particularly, cycle characteristics during high temperature operation at 60° C. or the like than the conventional lithium secondary battery. Furthermore, the present secondary battery can show a high output at a high electric current rate, and becomes extremely useful especially for uses requiring a high output at a high electric current rate, that is, nonaqueous electrolyte secondary batteries for automobiles and power tools such as electric tools.

MODES FOR CARRYING OUT THE INVENTION

The lithium mixed metal oxide of the present invention is represented by the following formula (A):

$$Li_x(Mn_{1-y-z}Ni_yFe_z)O_2 \quad (A)$$

wherein x is a value in the range of not less than 0.9 and not more than 1.3, y is a value in the range of not less than 0.46 and less than 0.5, and z is a value in the range of not less than 0 and less than 0.1.

In said formula (A), the case where the value of x is less than 0.9 or more than 1.3, is not preferable, because the capacity of the resulting nonaqueous electrolyte secondary battery becomes small. Furthermore, from the standpoint of making the capacity higher, preferably x is a value in the range of not less than 0.95 and not more than 1.15.

In said formula (A), the case where the value of y is less than 0.46, is not preferable, because the capacity of the resulting nonaqueous electrolyte secondary battery becomes small, and the case where the value of y is not less than 0.5, is not preferable, because cycle characteristics are deteriorated. The preferable value of y is in the range of not less than 0.46 and not more than 0.48.

In said formula (A), the case where the value of z is not less than 0.1, is not preferable, because cycle characteristics of the resulting nonaqueous electrolyte secondary battery are deteriorated. Furthermore, in order to improve cycle characteristics, particularly, cycle characteristics during high temperature operation at 60° C. or the like, z is preferably a value in the range of not less than 0.01 and not more than 0.08, and more preferably a value in the range of not less than 0.02 and not more than 0.07.

In the lithium mixed metal oxide of the present invention, from the standpoint of enhancing cycle characteristics of the resulting nonaqueous electrolyte secondary battery, preferably the value of (1-y-z) is larger than the value of y in said formula (A). That is, preferably the (molar) amount of Mn is larger than the (molar) amount of Ni in the formula (A).

From the standpoint of obtaining a nonaqueous electrolyte secondary battery having a high output and excellent cycle characteristics, in the lithium mixed metal oxide of the present invention, the mean value of particle diameters of constituent primary particles is preferably in the range of not less than 0.01 μm and not more than 0.5 μm. The lithium mixed metal oxide usually comprises primary particles and secondary particles in which primary particles are agglomerated. The particle diameter of secondary particles is preferably not less than 0.1 μm and not more than 3 μm. The particle diameter of primary particles and secondary particles can be measured by observing them with a scanning electron microscope (hereinafter sometimes referred to as SEM). The mean value of particle diameters of primary particles is more preferably not less than 0.05 μm and not more than 0.3 μm, and the mean value of particle diameters of secondary particles is more preferably not less than 0.15 μm and not more than 2 μm. In addition, the BET specific surface area of the lithium mixed metal oxide of the present invention is preferably not less than 3 $m^2/g$ and not more than 20 $m^2/g$.

From the standpoint of enhancing the effects of the present invention, the crystal structure of the lithium mixed metal oxide of the present invention is preferably α-NaFeO$_2$ type crystal structure, that is, the crystal structure belonging to R-3m space group. The crystal structure for the lithium mixed metal oxide can be identified from a powder X-ray diffraction pattern obtained by powder X-ray diffraction measurement using CuKα as a radiation source.

In addition, as long as the effects of the present invention are not damaged, a portion of Li, Ni, Mn, or Fe in the lithium mixed metal oxide of the present invention may be replaced by another element. Herein, the another element can include B, Al, Ga, In, Si, Ge, Sn, Mg, Sc, Y, Zr, Hf, Nb, Ta, Cr, Mo, W, Tc, Ru, Rh, Ir, Pd, Cu, Ag, Zn, and the like. The amount that can be replaced by these other elements, is preferably 0.001 to 0.1 mole per mole of Li.

A process for producing the lithium mixed metal oxide of the present invention can include, concretely, a production process comprising the following steps (1), (2) and (3) in this order:

(1) the step of bringing an aqueous solution containing Ni, Mn, Fe and Cl into contact with an alkali to obtain a coprecipitate slurry,
(2) the step of obtaining a coprecipitate from the coprecipitate slurry, and
(3) the step of obtaining the mixed metal oxide by subjecting a mixture obtained by mixing the coprecipitate, a lithium compound, and optionally an inactive flux to calcination by keeping the mixture at a temperature of less than 900° C.

In the above step (1), the aqueous solution containing Ni, Mn, Fe and Cl is obtained by selecting chlorides of Ni, Mn and Fe as their starting materials containing them respectively, and using these chlorides checkweighed so that Mn:Ni:Fe can become the above (1-y-z):y:z in their molar ratio. In addition, it is preferably an aqueous solution obtained by dissolving a chloride of Ni, a chloride of Mn, and a chloride of Fe in water. The chloride of Fe is preferably divalent Fe chloride. In addition, when starting materials containing Ni, Mn and Fe respectively are hardly soluble in water, for example, when these materials are oxides, hydroxides, or metal materials, an aqueous solution containing Ni, Mn, Fe and Cl can be obtained by dissolving these materials in an aqueous solution containing hydrochloric acid.

In the step (1), the alkali can include one or more kinds of anhydrates and/or one or more kinds of hydrates selected from the group consisting of LiOH (lithium hydroxide), NaOH (sodium hydroxide), KOH (potassium hydroxide), Li$_2$CO$_3$ (lithium carbonate), Na$_2$CO$_3$ (sodium carbonate), K$_2$CO$_3$ (potassium carbonate), and (NH$_4$)$_2$CO$_3$ (ammonium carbonate). In the step (1), preferably an aqueous solution of the above alkali is used. The aqueous alkali solution can include also ammonia water. The alkali concentration in the aqueous alkali solution is preferably about 0.5 to 10 M and more preferably about 1 to 8 M. In addition, from the standpoint of production cost, as the alkali to be used, it is preferable to use the anhydrate and/or hydrate of NaOH and/or KOH. In addition, two or more of the above alkalis may be used together.

A method for contact in the step (1) can include a method of adding an aqueous alkali solution to an aqueous solution containing Ni, Mn, Fe and Cl and mixing them, a method of adding an aqueous solution containing Ni, Mn, Fe and Cl to an aqueous alkali solution and mixing them, and a method of adding an aqueous solution containing Ni, Mn, Fe and Cl and an aqueous alkali solution to water and mixing them. During mixing of them, it is preferable to carry out stirring at the same time. In addition, among the above methods for contact, the method of adding an aqueous solution containing Ni, Mn, Fe and Cl to an aqueous alkali solution and mixing them can be used preferably, because pH change can be easily controlled. In this case, as an aqueous solution containing Ni, Mn, Fe and Cl is added to an aqueous alkali solution and they are mixed, the pH of the mixed liquid is apt to decrease, and it is good to add the aqueous solution containing Ni, Mn, Fe and Cl while controlling this pH so that it can be not less than 9, preferably not less than 10. In addition, it is preferable to bring an aqueous solution containing Ni, Mn, Fe and Cl into contact with an aqueous alkali solution while keeping either one aqueous solution or both aqueous solutions of them at a temperature of 40° C. to 80° C., because a coprecipitate of more uniform composition can be obtained.

In the step (1), as stated above, a coprecipitate is produced and a coprecipitate slurry can be obtained. In this connection, when z=0 in the lithium mixed metal oxide of the present invention, an aqueous solution containing Ni, Mn and Cl is used in place of an aqueous solution containing Ni, Mn, Fe and Cl.

In the step (2), a coprecipitate is obtained from the above coprecipitate slurry. As long as a coprecipitate can be obtained, the step (2) may be carried out by any method, but a solid-liquid separation method such as filtration is preferably used from the standpoint of ease of operation. A coprecipitate can be obtained also by a method of evaporating a liquid from a coprecipitate slurry by heating of spray drying or the like.

When a coprecipitate is obtained by solid-liquid separation in the step (2), the above step (2) is preferably the following step (2'):

(2') a step of obtaining a coprecipitate by carrying out washing and drying after solid-liquid separation of the coprecipitate slurry.

When an alkali and Cl are present excessively in the solid content obtained after solid-liquid separation, they can be removed by washing in the step (2'). From the standpoint of washing the solid content efficiently, it is preferable to use water as a washing liquid. In this connection, as necessary, a water-soluble organic solvent such as an alcohol, and acetone may be added to a washing liquid. In addition, washing may be carried out two or more times, for example, after water washing is carried out, washing may be carried out again with the water-soluble organic solvent as stated above.

In the step (2'), after washing, drying is carried out to obtain a coprecipitate. Drying is carried out preferably by heat treatment but may be carried out by air blast drying, vacuum drying or the like. When drying is carried out by heat treatment, it is carried out preferably at 50 to 300° C., and more preferably at about 100° C. to 200° C.

In the step (3), the coprecipitate obtained as stated above, and a lithium compound, and, as necessary, an inactive flux are mixed, and the resultant mixture is calcined to obtain a lithium mixed metal oxide. The lithium compound can include one or more kinds of anhydrates and/or one or more kinds of hydrates selected from the group consisting of lithium hydroxide, lithium chloride, lithium nitrate, and lithium carbonate. As the inactive flux, there can be preferably used those which hardly react with starting materials for the lithium mixed metal oxide. It can include, for example, chlorides such as NaCl, KCl, and $NH_4Cl$, fluorides such as NaF, KF, and $NH_4F$, boric acid, preferably the above chlorides. By mixing the inactive flux therein, reactivity of the mixture during calcination is enhanced, and in some cases the particle diameter of primary particles, the particle diameter of secondary particles, and the BET specific surface area of the resultant lithium mixed metal oxide can be adjusted. In addition, two or more kinds of inactive flux may be used together. The inactive flux may remain in the lithium mixed metal oxide after calcination, or may be removed by washing, evaporation or the like after calcination. The amounts of the above coprecipitate, the lithium compound, and the inactive flux used for mixing are preferably 30 to 200 parts by weight of the lithium compound and 50 to 300 parts by weight of the inactive flux per 100 parts by weight of the above coprecipitate.

Mixing may be carried out by either of dry blending and wet blending, but from the standpoint of simpleness, dry blending is preferable. The mixing equipment can include stirring mixer, V type mixer, W type mixer, ribbon mixer, drum mixer, ball mill, and the like.

The keeping temperature in the above calcination is an important factor from the standpoint of adjusting the particle diameter of primary particles, the particle diameter of secondary particles, and the BET specific surface area of the lithium mixed metal oxide. Usually, as the keeping temperature becomes higher, the particle diameter of primary particles and the particle diameter of secondary particles are apt to become larger, and the BET specific surface area is apt to become smaller. For example, in the case where calcination is carried out using KCl as an inactive flux by keeping at 900° C. in the step (3), the mean value of particle diameters of primary particles is about 0.7 μm to 1 μm, the mean value of particle diameters of secondary particles consisting of agglomerates of primary particles in the resultant lithium mixed metal oxide is around from 5 μm to 20 μm, and the BET specific surface area is around 0.3 $m^2$/g. As the keeping temperature is made lower than this temperature, the particle diameter of primary particles and the particle diameter of secondary particles are apt to become smaller, and the BET specific surface area is apt to become larger. The keeping temperature is preferably in the range of not less than 650° C. and not more than 850° C. The time for keeping at the above keeping temperature is usually 0.1 to 20 hours, and preferably 0.5 to 8 hours. The rate of temperature rise to the above keeping temperature is usually 50° C. to 400° C./hour, and the rate of temperature drop to room temperature from the above keeping temperature is usually 10° C. to 400° C./hour.

In addition, as the atmosphere for calcination, there can be used air, oxygen, nitrogen, argon, or the mixture gas thereof, but atmospheric air is preferable.

In addition, after the above calcination, the resultant lithium mixed metal oxide may be pulverized by use of ball mill, jet mill, or the like. By pulverization, in some cases the BET specific surface area of the lithium mixed metal oxide can be adjusted. In addition, pulverization and calcination may be carried out two or more times repeatedly. In addition, the lithium mixed metal oxide may be washed or classified as necessary.

The above lithium mixed metal oxide of the present invention becomes a lithium mixed metal oxide useful for a nonaqueous electrolyte secondary battery more excellent in cycle characteristics.

In addition, as long as the effects of the present invention are not damaged, a compound different from the lithium mixed metal oxide of the present invention may be attached to the surface of particles constituting the lithium mixed metal oxide. The compound can include compounds containing one or more kinds of elements selected from the group consisting of B, C, Al, Ga, In, Si, Ge, Sn, Mg and transition metal elements, preferably compounds containing one or more kinds of elements selected from the group consisting of B, C, Al, Mg, Ga, In, and Sn, and more preferably compounds of Al. Specifically, the compound can include oxides, hydroxides, oxyhydroxides, carbonates, nitrates, organic acid salts of the above elements, preferably oxides, hydroxides, and oxyhydroxides. In addition, these compounds may be used by mixture. Among these compounds, a particularly preferable compound is alumina. In addition, after attachment, heating may be carried out. The attachment amount of the above compound different from the lithium mixed metal oxide is preferably 0.001 to 0.1 mole per mole of Li.

A positive electrode active material comprising the lithium mixed metal oxide of the present invention is suitable for a nonaqueous electrolyte secondary battery. In addition, in the present invention, the positive electrode active material may consist of the lithium mixed metal oxide of the present invention, or may contain as the main component the lithium mixed metal oxide by attaching the different compound on the surface of particles as stated above, or the like.

As an example of a method for producing a positive electrode by use of the above positive electrode active material, the case of producing a positive electrode for a nonaqueous electrolyte secondary battery is explained as follows.

A positive electrode is produced by having a positive electrode mixture containing a positive electrode active material, a conductive material, and a binder supported on a positive electrode collector. As the conductive material, a carbonaceous material can be used, and the carbonaceous material can include graphite powder, carbon black, acetylene black, fibrous carbonaceous material, and the like. Carbon black and acetylene black are fine particles and have large surface area. Therefore, by adding a small amount of them in the positive electrode mixture, the electrical conductivity within the positive electrode can be increased, and charge and discharge efficiency and rate characteristics can be enhanced, but when a too much amount is added therein, the binding property between the positive electrode mixture and the positive electrode collector by a binder is reduced, and rather increase in the internal resistance is caused. Preferably, the proportion of the conductive material in the positive electrode mixture is not less than 5 parts by weight and not more than 20 parts by weight per 100 parts by weight of the positive electrode active material. In the case of using, as a conductive material, a fibrous carbonaceous material such as graphitized carbon fiber or carbon nanotube, it is possible to reduce this proportion.

As the above binder, a thermoplastic resin can be used. Specifically, it includes fluorocarbon resins such as polyvinylidene fluoride (hereinafter sometimes referred to as PVdF), polytetrafluoroethylene (hereinafter sometimes referred to as PTFE), tetrafluoroethylene-hexafluoropropylene-vinylidene fluoride type copolymer, hexafluoropropylene-vinylidene fluoride type copolymer, and tetrafluoroethylene-perfluorovinyl ether type copolymer; polyolefin resins such as polyethylene, and polypropylene; and the like. In addition, two or more kinds of them may be used by mixture. In addition, by using, as a binder, the fluorocarbon resin and the polyolefin resin so that the fluorocarbon resin can be incorporated in the proportion of 1 to 10 weight % relative to the positive electrode mixture and the polyolefin resin can be incorporated in the proportion of 0.1 to 2 weight % relative to the positive electrode mixture, there can be obtained the positive electrode mixture, which is excellent in the binding property with the positive electrode collector.

As the above positive electrode collector, there can be used Al, Ni, stainless steel or the like, and Al is preferable from the standpoint that it is easily processed into a thin film and inexpensive. A method for having the positive electrode mixture supported on the positive electrode collector includes a method of pressure molding or a method of subjecting a paste obtained by using an organic solvent or the like to applying on the positive electrode collector, drying and then firmly fixing by pressing or the like. In the case of pasting, a slurry consisting of a positive electrode active material, a conductive material, a binder, and an organic solvent is prepared. The organic solvent includes amine type solvents such as N,N-dimethylaminopropylamine, and diethylenetriamine; ether type solvents such as tetrahydrofuran; ketone type solvents such as methyl ethyl ketone; ester type solvents such as methyl acetate; amide type solvents such as dimethylacetamide, and N-methyl-2-pyrolidone; and the like.

A method for applying the positive electrode mixture on the positive electrode collector includes, for example, slit die coating method, screen coating method, curtain coating method, knife coating method, gravure coating method, and static spraying method. A positive electrode can be produced by the methods enumerated above.

As an example of a method for producing a nonaqueous electrolyte secondary battery by use of the above positive electrode, the case of producing a lithium secondary battery is explained as follows. That is, it can be produced by laminating and winding a separator, a negative electrode, and the above positive electrode, placing the resultant electrode group in a battery can, and then impregnating an electrolytic solution therein.

The form of the above electrode group can include, for example, circle, ellipse, rectangle, and wany rectangle as the form of the cross-section obtained when the electrode group is cut in the vertical direction to the axis of winding. In addition, the shape of the battery can include, for example, paper type, coin type, cylinder type, and rectangular solid type.

The above negative electrode can include an electrode consisting of a negative electrode mixture containing a negative electrode material supported on a negative electrode collector, or an electrode consisting of only a negative electrode material, as long as the doping and dedoping of lithium ions are possible at an electrical potential lower than that of the positive electrode. The negative electrode material includes carbonaceous materials, chalcogen compounds (oxides, sulfides, and the like), nitrides, metals, or alloys, wherein the doping and dedoping of lithium ions are possible at an electrical potential lower than that of the positive electrode. In addition, these negative electrode materials may be used by mixture.

Examples of the above negative electrode material are shown as follows. The above carbonaceous material can include, specifically, graphites such as natural graphite, and artificial graphite, cokes, carbon black, pyrolytic carbons, carbon fiber, calcined products of organic high-molecular compounds, and the like. The above oxide can include, specifically, oxides of silicon represented by the formula, $SiO_x$, wherein x is a positive real number, such as $SiO_2$ and $SiO$; oxides of titanium represented by the formula, $TiO_x$, wherein x is a positive real number, such as $TiO_2$ and $TiO$; oxides of vanadium represented by the formula, $VO_x$, wherein x is a positive real number, such as $V_2O_5$ and $VO_2$; oxides of iron represented by the formula, $FeO_x$ wherein x is a positive real number, such as $Fe_3O_4$, $Fe_2O_3$, and $FeO$; oxides of tin represented by the formula, $SnO_x$, wherein x is a positive real number, such as $SnO_2$ and $SnO$; oxides of tungsten represented by the general formula, $WO_x$, wherein x is a positive real number, such as $WO_3$ and $WO_2$; mixed metal oxides containing lithium and titanium and/or vanadium such as $Li_4Ti_5O_{12}$ and $LiVO_2$ (for example, $Li_{1.1}V_{0.9}O_2$); and the like. The above sulfide can include, specifically, sulfides of titanium represented by the formula, $TiS_x$, wherein x is a positive real number, such as $Ti_2S_3$, $TiS_2$, and $TiS$; sulfides of vanadium represented by the formula, $VS_x$, wherein x is a positive real number, such as $V_3S_4$, $VS_2$, and $VS$; sulfides of iron represented by the formula, $FeS_x$, wherein x is a positive real number, such as $Fe_3S_4$, $FeS2$, and $FeS$; sulfides of molybdenum represented by the formula, $MoS_x$, wherein x is a positive real number, such as $Mo_2S_3$, and $MoS_2$; sulfides of tin represented by the formula, $SnS_x$, wherein x is a positive real number, such as $SnS_2$ and $SnS$; sulfides of tungsten represented by the formula, $WS_x$, wherein x is a positive real number, such as $WS_2$; sulfides of antimony represented by the formula, $SbS_x$, wherein x is a positive real number, such as $Sb_2S_3$; sulfides of selenium represented by the formula, $SeS_x$, wherein x is a positive real number, such as $Se_5S_3$, $SeS_2$, and $SeS$; and the like. The above nitride can include, specifically, lithium-containing nitrides such as $Li_3N$ and $Li_{3-x}A_xN$, wherein A stands for Ni and/or Co, and $0<x<3$. These carbonaceous materials, oxides, sulfides, and nitrides may be used in combination, and may be crystalline or amorphous. In addition, these carbonaceous materials, oxides, sulfides, and nitrides are mainly supported on a negative electrode collector and used as an electrode.

In addition, the above metal includes, specifically, lithium metal, silicon metal, and tin metal. In addition, the above alloy can include lithium alloys such as Li—Al, Li—Ni, and Li—Si; silicon alloys such as Si—Zn; tin alloys such as Sn—Mn, Sn—Co, Sn—Ni, Sn—Cu, and Sn—La; and other alloys such as $Cu_2Sb$ and $La_3Ni_2Sn_7$. These metals and alloys are mainly used singly as an electrode. (For example, they are used in the form of a foil.)

Among the above negative electrode materials, a carbonaceous material containing mainly graphite such as natural graphite or artificial graphite is preferably used from the standpoints of high evenness in electrical potential, lowness in average discharge potential, good cycle characteristics, and the like. The shape of the carbonaceous material may be any of, for example, flake shape as in natural graphite, sphere shape as in meso-carbon-microbeads, fiber shape as in graphitized carbon fiber, or agglomerate of fine powders.

The above negative electrode mixture may contain a binder as necessary. The binder can include a thermoplastic resin, specifically, PVdF, thermoplastic polyimide, carboxymethylcellulose, polyethylene, polypropylene, and the like.

The above negative electrode collector can include Cu, Ni, stainless steel, and the like, but it is recommended to use Cu from the standpoints of hardly making an alloy with lithium and of easily processing into a thin film. A method for having a negative electrode mixture supported on the negative electrode collector is similar to the case of a positive electrode, and includes a method by pressure molding, a method of subjecting a paste by use of an organic solvent or the like to applying on the negative electrode collector, drying and then firmly fixing by pressing, and the like.

As the above separator, there can be used a material comprising a conformation such as porous film, nonwoven fabric, woven fabric, or the like, which is made of a material of, for example, polyolefin resin such as polyethylene or polypropylene, fluorocarbon resin, or nitrogen-containing aromatic polymer. In addition, two or more kinds of the above materials may be used to make the separator, and the above materials may be laminated with each other. The separator can include the separators as disclosed in, for example, JP-A-2000-30686, and JP-A-10-324758. The thickness of the separator is preferably made thinner, as long as the mechanical strength can be retained, because the volume energy density of the battery increases and the internal resistance becomes smaller. It is usually around from 5 to 200 μm and preferably around from 5 to 40 μm.

The separator has preferably a porous film containing a thermoplastic resin. A nonaqueous electrolyte secondary battery has preferably a function by which, when an abnormal electric current flows in the battery usually because of short circuit between the positive electrode and negative electrode or the like, the current is interrupted to block (shutdown) the flow of excessive electric current. Herein, in the case of exceeding the usual working temperature, shutdown is carried out by blocking up fine pores of the porous film in the separator. After shutdown, even if the temperature in the battery increases to a certain high temperature, it is preferable to retain the shutdown state without breaking the film because of the temperature. Such a separator includes a laminated film that has a heat-resistant porous layer and a porous film laminated to each other, and it becomes possible to enhance the heat resistance of the secondary battery in the present invention by using the film as a separator. In this connection, the heat-resistant porous layers may be laminated on both faces of the porous film.

Hereinafter, the above laminated film that has a heat-resistant porous layer and a porous film laminated to each other is explained.

In the above laminated film, the heat-resistant porous layer is higher in heat resistance than the porous film, and the heat-resistant porous layer may be formed from inorganic powders or may contain a heat-resistant resin. The heat-resistant porous layer can be formed by incorporating a heat-resistant resin in the heat-resistant porous layer with an easy method such as coating. The heat-resistant resin can include polyamide, polyimide, polyamideimide, polycarbonate, polyacetal, polysulfone, polyphenylene sulfide, polyetherketone, aromatic polyester, polyether-sulfone, and polyetherimide. From the standpoint of enhancing heat resistance, polyamide, polyimide, polyamideimide, polyether-sulfone, and polyether-imide are preferable, and polyamide, polyimide, and polyamideimide are more preferable. Nitrogen-containing aromatic polymers such as aromatic polyamide (para-oriented aromatic polyamide, meta-oriented aromatic polyamide), aromatic polyimide, and aromatic polyamideimide are further more preferable; and aromatic polyamide is especially preferable; and from the standpoint of production, para-oriented aromatic polyamide (hereinafter sometimes referred to as "para-aramid") is particularly preferable. In addition, the heat-resistant resin can include poly-4-methylpentene-1 and cyclic olefin polymers. By use of these heat-resistant resins, it is possible to enhance the heat resistance of the laminated film, that is, the film-breaking temperature of the laminated film. In the case of using a nitrogen-containing aromatic polymer among these heat-resistant resins, perhaps owing to the polarity in its molecule, affinity with an electrolytic solution, that is, the solution-holding property in the heat-resistant porous layer is enhanced in some cases, and moreover the impregnation velocity of an electrolytic solution at the time of producing a nonaqueous electrolyte secondary battery is high, and furthermore the charge and discharge capacity of the nonaqueous electrolyte secondary battery is enhanced.

The film-breaking temperature of such a laminated film depends on the kind of a heat-resistant resin, and so a heat-resistant resin is selected and used in accordance with the locale of use and the purpose of use. More concretely, it is possible to control the film-breaking temperature at about 400° C. in the case of using, as a heat-resistant resin, the above nitrogen-containing aromatic polymer, at about 250° C. in the case of using poly-4-methylpentene-1, and at about 300° C. in the case of using a cyclic olefin polymer, respectively. In addition, when the heat-resistant porous layer consists of inorganic powders, it is also possible to control the film-breaking temperature, for example, at 500° C. or higher.

The above para-aramid is obtained by polycondensation of a para-oriented aromatic diamine and a para-oriented aromatic dicarboxylic halide, and consists substantially of repeating units wherein amide bonds are bonded at para positions or the similar oriented positions (oriented positions lined up coaxially or parallel in opposite directions as in, for example, 4,4'-biphenylene, 1,5-naphthalene, and 2,6-naphthalene). Examples of a para-aramid having the structure of para-oriented type or similar to para-oriented type are specifically poly(para-phenyleneterephthalamide), poly(para-benzamide), poly(4,4'-benzanilideterephthalamide), poly(para-phenylene-4,4'-biphenylenedicarboxylic acid amide), poly(para-phenylene-2,6-naphthalenedicarboxylic acid amide), poly(2-chloro-para-phenyleneterephthalamide), and para-phenyleneterephthalamide/2,6-dichloro-para-phenyleneterephthalamide copolymer.

As the above aromatic polyimide, all the aromatic polyimides produced by the polycondensation of aromatic diacid anhydrides and diamines are preferable. Specific examples of the diacid anhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoroprapane, and 3,3',4,4'-biphenyltetracarboxylic dianhydride. Specific examples of the diamine include oxydianiline, para-phenylene diamine, benzophenone diamine, 3,3'-methylenedianiline, 3,3'-diaminobenzophenone, 3,3'-diaminodiphenylsulfone, and 1,5'-naphthalene diamine. In addition, a polyimide soluble in a solvent can be used preferably. Such a polyimide includes, for example, the polyimides produced by the polycondensation of 3,3',4,4'-diphenylsulfonetetracarboxylic dianhydride and aromatic diamines.

The above aromatic polyamideimide includes those which are obtained by polycondensation of an aromatic dicarboxylic acid and an aromatic diisocyanate, and those which are obtained by polycondensation of an aromatic diacid anhydride and an aromatic diisocyanate. Specific examples of the aromatic dicarboxylic acid include isophthalic acid, and terephthalic acid. In addition, specific examples of the aromatic diacid anhydride include trimellitic anhydride. Specific examples of the aromatic diisocyanate include 4,4'-diphenylmethane diisocyanate, 2,4-tolylene diisocyanate, 2,6-tolylene diisocyanate, ortho-trilan diisocyanate, and m-xylene diisocyanate.

In addition, from the standpoint of enhancing ion permeability, it is preferable to use a heat-resistant porous layer having a thin thickness of not less than 1 μm and not more than 10 μm, more preferably not less than 1 μm and not more than 5 and particularly preferably not less than 1 μm and not more than 4 μm. In addition, the heat-resistant porous layer has fine pores, the size (diameter) of which is usually not more than 3 μm and preferably not more than 1 μm. In addition, when the heat-resistant porous layer contains a heat-resistant resin, the heat-resistant porous layer may further contain a filler to be hereinafter described.

In the above laminated film, the porous film has fine pores and preferably has shutdown function. In this case, the porous film contains a thermoplastic resin. The size of fine pores in the porous film is usually not more than 3 μm and preferably not more than 1 μm. The void content of the porous film is usually 30 to 80 volume % and preferably 40 to 70 volume %. In a nonaqueous electrolyte secondary battery, in the case of exceeding the usual working temperature, the porous film containing a thermoplastic resin can block up fine pores owing to the softening of the thermoplastic resin constituting it.

As the above thermoplastic resin, it is recommended to select those which are not soluble in the electrolytic solution in a nonaqueous electrolyte secondary battery. It can include, specifically, a polyolefin resin such as polyethylene and polypropylene, and a thermoplastic polyurethane resin, and a mixture of two or more kinds of them may be used. It is preferable to incorporate polyethylene from the standpoint of softening at a lower temperature and shutting down. The polyethylene can include, specifically, polyethylenes such as low density polyethylene, high density polyethylene, and linear polyethylene, and furthermore ultrahigh molecular weight polyethylene having a molecular weight of not less than 1,000,000. From the standpoint of enhancing the piercing strength of the porous film, the thermoplastic resin constituting the film preferably contains at least the ultrahigh molecular weight polyethylene. In addition, in the aspect of producing the porous film, in some cases the thermoplastic resin preferably contains a wax consisting of a polyolefin having a low molecular weight (weight average molecular weight of not more than 10,000).

In addition, the thickness of the porous film in the laminated film is usually 3 to 30 μm, and more preferably 3 to 25 μm. In addition, in the present invention, the thickness of the laminated film is usually not more than 40 μm, and preferably not more than 20 μm. In addition, assuming that the thickness of the heat-resistant porous layer is A (μm) and the thickness of the porous film is B (μm), preferably the value of A/B is not less than 0.1 and not more than 1.

In addition, when the heat-resistant porous layer contains the heat-resistant resin, the heat-resistant porous layer may contain one or more kinds of fillers. The material of a filler may be selected from any of organic powders, inorganic powders, or the mixture thereof. The average particle diameter of particles constituting the filler is preferably not less than 0.01 μm and not more than 1 μm.

The above organic powders include powders consisting of organic materials of, for example, homopolymers of one kind or copolymers of two or more kinds selected from styrene, vinylketone, acrylonitrile, methylmethacrylate, ethylmethacrylate, glycidyl methacrylate, glycidyl acrylate, and methyl acrylate; fluorocarbon resins such as polytetrafluoroethylene, tetrafluoroethylene-hexafluoropropylene copolymer, tetrafluoroethylene-ethylene copolymer, and polyvinylidene fluoride; melamine resin; urea resin; polyofefin; and polymethacrylate. The organic powders may be used singly or may be used as a combination of two or more kinds. Among these organic powders, polytetrafluoroethylene powders are preferable in the point of chemical stability.

The above inorganic powders include powders consisting of inorganic materials such as metal oxides, metal nitrides, metal carbides, metal hydroxides, carbonates, and sulfates. Among them, powders consisting of inorganic materials having low electrical conductivity are preferably used. Specific examples include powders consisting of alumina, silica, titanium dioxide, calcium or carbonate. The inorganic powders may be used singly or may be used as a combination of two or more kinds. Among these inorganic powders, alumina powders are preferable in the point of chemical stability. In this connection, more preferably all of the particles constituting a filler are alumina particles, and further more preferable is the working embodiment wherein all of the particles constituting a filler are alumina particles and a portion or the whole of them consists of approximately spherical alumina particles. By the way, when the heat-resistant porous layer is formed from organic powders, it is recommended to use the above organic powders shown as examples, and it is recommended to use them as a mixture with a binder as necessary.

The content of a filler in the case where the heat-resistant porous layer contains the heat-resistant resin, depends on the specific gravity of the material of the filler, but, for example, in the case where all of the particles constituting the filler are alumina particles, the weight of the filler is usually not less than 5 and not more than 95, preferably not less than 20 and not more than 95, and more preferably not less than 30 and not more than 90, assuming that the total weight of the heat-resistant porous layer is 100. These ranges can be appropriately determined depending on the specific gravity of the material of the filler.

The shape of a filler includes approximately spherical shape, plate shape, columnar shape, acicular shape, whisker shape, fibrous shape, and the like. Particles of any shape can be used, but from the standpoint of easily forming uniform pores, approximately spherical particles are preferable. Approximately spherical particles include particles having an aspect ratio (long diameter of particles/short diameter of particles) in the range of not less than 1 and not more than 1.5. The aspect ratio of particles can be measured with an electron microscopic picture.

With regard to the separator in the present invention, from the standpoint of ion permeability, the air permeability by Gurley method is preferably 50 to 300 sec/100 cc, and more preferably 50 to 200 sec/100 cc. In addition, the void content of the separator is usually 30 to 80 volume %, and preferably 40 to 70 volume %. A separator may be formed by laminating separators different in void contents.

In the secondary battery, the electrolytic solution usually contains an electrolyte and an organic solvent. The electrolyte includes lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB wherein BOB means bis(oxalato)borate, lower aliphatic carboxylic acid lithium salts, and $LiAlCl_4$. A mixture of two or more kinds of them may be used. Usually, there are used lithium salts containing at least one kind selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ containing fluorine among them.

In addition, in the above electrolytic solution, as the organic solvent there can be used, for example, carbonates such as propylene carbonate, ethylene carbonate, dimethyl carbonate, diethyl carbonate, ethylmethyl carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, terahydrofuran, and 2-methylterahydrofuran; esters such as methyl formate, methyl acetate, and γ-butyrolactone; nitriles such as acetonitrile, and butyronitrile; amides such as N,N-dimethylformamide, and N,N-dimethylacetamide; carbamates such as 3-methyl-2-oxazolidone; sulfur-containing compounds such as sulfolane, dimethylsulfoxide, and 1,3-propanesultone; or the above organic solvents further having a fluorine substituent introduced therein. Usually, two or more kinds of them are used by mixture. Among them, mixed solvents containing carbonates are preferable, and mixed solvents of cyclic carbonates and acyclic carbonates, or mixed solvents of cyclic carbonates and ethers are further preferable. As a mixed solvent of a cyclic carbonate and an acyclic carbonate, a mixed solvent containing ethylene carbonate, dimethyl carbonate, and ethylmethyl carbonate is preferable in the point of having a broad yield temperature range, having excellent load characteristics, and being hardly resolvable even when a graphite material such as natural graphite or artificial graphite is used as a negative electrode active material. In addition, in the point that particularly excellent stability-enhancing effect is obtained, it is preferable to use an electrolytic solution containing a fluorine-containing lithium salt such as $LiPF_6$ and an organic solvent having a fluorine constituent. A mixed solvent containing an ether having a fluorine constituent such as pentafluoropropyl methyl ether or 2,2,3,3-tetrafluoropropyl difluoromethyl ether, and dimethyl carbonate is excellent also in large-current discharge characteristics and further preferable.

In place of the above electrolytic solution, a solid electrolyte may be used. As the solid electrolyte, there can be used an organic high-molecular electrolyte such as, for example, polyethylene oxide type high-molecular compound, a high-molecular compound containing at least one kind of a polyorganosiloxane chain or a polyoxyalkylene chain, or the like. In addition, there can be used the so-called gel type having a nonaqueous electrolytic solution supported on a high-molecular compound. In addition, there may be used an inorganic solid electrolyte containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, or $Li_2S$—$SiS_2$—$Li_2SO_4$. By using these solid electrolytes, in some cases stability can be enhanced. In addition, in the nonaqueous electrolyte secondary battery of the present invention, when a solid electrolyte is used, in some cases the solid electrolyte fulfills the role of a separator, and in the cases a separator may not be required.

EXAMPLES

Next, the present invention is explained in more detail by way of Examples. In this connection, evaluation of a lithium mixed metal oxide (positive electrode active material), and charge and discharge test were carried out as follows.

(1) Production of Positive Electrode

An N-methyl-2-pyrolidone (hereinafter sometimes referred to as NMP) solution of PVdF as a binder was added to a mixture of a positive electrode active material and a conductive material (a 9:1 mixture of acetylene black and graphite) so as to give a composition of the active material:the conductive material:the binder=86:10:4 (weight ratio), and they were kneaded to produce a paste. The paste was applied on an Al foil having a thickness of 40 μm as a collector, and the applied Al foil was subjected to vacuum drying at 150° C. for 8 hours to obtain a positive electrode.

(2) Production of Nonaqueous Electrolyte Secondary Battery (Coin Cell)

The positive electrode obtained in (1) was placed on the bottom cover of the coin cell (manufactured by Hohsen Corp.) while casting down the aluminum foil face, and the after-mentioned laminated film separator (a heat-resistant porous layer was laminated on a porous film made of polyethylene (thickness: 16 μm)) was placed thereon. Therein was poured 300 μl of an electrolytic solution (wherein $LiPF_6$ was dissolved in a 30:35:35 (volume ratio) mixed liquid of ethylene carbonate (hereinafter sometimes referred to as EC), dimethyl carbonate (hereinafter sometimes referred to as DMC), and ethylmethyl carbonate (hereinafter sometimes referred to as EMC) so as to give 1 mole/liter (hereinafter sometimes referred to as $LiPF_6$/EC+DMC+EMC)). Next, metal lithium as a negative electrode was placed on the laminated film separator, the top cover was closed through a gasket, and caulking was carried out with a caulking tool to produce a nonaqueous electrolyte secondary battery (coin type cell R2032). In this connection, assembling of the battery was carried out in a globe box having argon atmosphere.

(3) Charge and Discharge Test

By use of the above coin type cell, cycle test and discharge rate test were carried out under the conditions shown below. 60° C. discharge capacity maintenance factor in the cycle test and 0.2 C discharge capacity ratio in the discharge rate test were obtained respectively as shown below.

<Cycle Test>
Test temperature: 60° C.
The number of times in cycles: 20 times
Charge maximum voltage: 4.3 V, charge time: 8 hours, charge current: 0.2 mA/cm²
Discharge minimum voltage: 3.0 V, constant current discharge, discharge current: 0.2 mA/cm²
<60° C. Discharge Capacity Maintenance Factor>

60° C. discharge capacity maintenance factor (%)=the 20th cycle discharge capacity/the 1st cycle discharge capacity×100

<Discharge Rate Test>
Test temperature: 25° C.
Charge maximum voltage: 4.3 V, charge time: 8 hours, charge current: 0.2 mA/cm²
At the time of discharge, discharge minimum voltage was made constant at 3.0 V, and discharge current was changed as mentioned below. When discharge capacity at 20 C (high current rate) is higher, higher output is shown.
Discharge (0.2 C) in the 1st cycle: discharge current, 0.2 mA/cm²
Discharge (20 C) in the 2nd cycle: discharge current, 20 mA/cm²
<0.2 C Discharge Capacity Ratio>

0.2 C discharge capacity ratio (%)=20 C discharge capacity/0.2 C discharge capacity×100

(4) Evaluation of Positive Electrode Active Material

1. Composition Analysis of Lithium Mixed Metal Oxide

After dissolving the powders in hydrochloric acid, the measurement was carried out by use of inductively coupled plasma-atomic emission spectroscopy (SPS3000, hereinafter sometimes called as ICP-AES).

2. SEM Observation of Lithium Mixed Metal Oxide

Particles constituting a lithium mixed metal oxide were placed on a conductive sheet attached on a sample stage, and SEM observation was carried out with JSM-5510 manufactured by JEOL Ltd. while irradiating electron beam having an acceleration voltage of 20 kV. The mean value of particle diameters was obtained by selecting 50 particles arbitrarily from the image (SEM photograph) obtained by the SEM observation, measuring the diameters of the respective particles, and calculating the mean value of them.

3. Measurement of BET Specific Surface Area of Lithium Mixed Metal Oxide

After 1 g of the powders was dried at 150° C. for 15 minutes in nitrogen atmosphere, the measurement was carried out by use of FlowSorb II2300 manufactured by Micromeritics.

4. Powder X-ray Diffraction Measurement of Lithium Mixed Metal Oxide

The powder X-ray diffraction measurement of a lithium mixed metal oxide was carried out by use of RINT2500TTR type manufactured by Rigaku Corporation. After filling the lithium mixed metal oxide in the exclusive substrate, the measurement was carried out in the range of 10° to 90° as the diffraction angle, 2 θ by use of CuKα radiation source to obtain a powder X-ray diffraction figure.

Example 1

1. Production of Lithium Mixed Metal Oxide

In a beaker made of polypropylene, 83.88 g of potassium hydroxide was added in 200 ml of distilled water and completely dissolved therein by stirring to prepare an aqueous potassium hydroxide solution (aqueous alkali solution). In addition, in a beaker made of glass, 28.18 g of nickel (II) chloride hexahydrate, 23.73 g of manganese (II) chloride tetrahydrate, and 3.51 g of iron (II) chloride hexahydrate (Ni:Mn:Fe =0.46:0.47:0.07 in molar ratio) were added in 200 ml of distilled water and dissolved therein by stirring to obtain an aqueous nickel-manganese-iron mixed solution. The above aqueous nickel-manganese-iron mixed solution was added dropwise in the above aqueous potassium hydroxide solution, while stirring it, to obtain a coprecipitate slurry. In this connection, the pH at the reaction end point was measured to obtain a pH of 13.

Next, the coprecipitate slurry was filtered, and washing with distilled water and drying at 100° C. were carried out to obtain a coprecipatate $P_1$. In an agate mortar, 3.0 g of the coprecipatate $P_1$, 1.634 g of lithium hydroxide monohydrate, and 1.743 g of potassium chloride as an inactive flux were subjected to dry blending to obtain a mixture. Thereafter, the mixture was charged in a calcination vessel made of alumina, and was kept at 800° C. for 6 hours in air atmosphere by use of an electric furnace to carry out calcination, and then was cooled to room temperature to obtain a calcined product. The product was pulverized, washed by decantation with distilled water, filtered, and then dryed at 300° C. for 6 hours to obtain powders $A_1$.

As the result of composition analysis of the powders $A_1$, the molar ratio of Li:Ni:Mn:Fe was 1.13:0.46:0.47:0.07. In addition, the BET specific surface area of the powders $A_1$ was 6 $m^2/g$, and in SEM observation of the powders $A_1$, the mean value of diameters of primary particles was 0.2 μm and the mean value of diameters of secondary particles was 0.6 μm. In addition, as the result of powder X-ray diffraction measurement, the crystal structure of the powders $A_1$ was found to be the crystal structure belonging to R-3m space group.

2. Discharge Rate Test and Cycle Test of Nonaqueous Electrolyte Secondary Battery By use of the powders $A_1$, a coin type cell was produced, and discharge rate test was carried out, and as the result thereof, the discharge capacities (mAh/g) in 0.2 C and 20 C were respectively 135 and 88, and 0.2 C discharge capacity ratio (%) was 65, which was high. In addition, cycle test of charge and discharge was carried out 20 times repeatedly, and as the result thereof, the discharge capacities (mAh/g) in the 1st cycle and the 20th cycle were respectively 145 and 141, and discharge capacity maintenance factor (%) was 97, which was high. The results of 60° C. discharge capacity maintenance factor and 0.2 C discharge capacity ratio are shown in Table 1.

Example 2

1. Production of Lithium Mixed Metal Oxide

Except that the molar ratio of Ni:Mn:Fe was adjusted so as to give 0.47:0.48:0.05, handlings similar to those of Example 1 were carried out to obtain powders $A_2$. As the result of composition analysis of the powders $A_2$, the molar ratio of Li:Ni:Mn:Fe was 1.07:0.47:0.48:0.05. In addition, the BET specific surface area of the powders $A_2$ was 6 $m^2/g$, and in SEM observation of the powders $A_2$, the mean value of diameters of primary particles was 0.2 μm and the mean value of diameters of secondary particles was 0.6 μm. In addition, as the result of powder X-ray diffraction measurement, the crystal structure of the powders $A_2$ was found to be the crystal structure belonging to R-3m space group.

2. Discharge Rate Test and Cycle Test of Nonaqueous Electrolyte Secondary Battery By use of the powders $A_2$, a coin type cell was produced, and discharge rate test was carried out, and as the result thereof, the discharge capacities (mAh/g) in 0.2 C and 20 C were respectively 140 and 92, and 0.2 C discharge capacity ratio (%) was 66, which was high. In addition, cycle test of charge and discharge was carried out 20 times repeatedly, and as the result thereof, the discharge capacities (mAh/g) in the 1st cycle and the 20th cycle were respectively 153 and 147, and discharge capacity maintenance factor (%) was 96, which was high. The results of 60° C. discharge capacity maintenance factor and 0.2 C discharge capacity ratio are shown in Table 1.

Example 3

1. Production of Lithium Mixed Metal Oxide

Except that the molar ratio of Ni:Mn:Fe was adjusted so as to give 0.48:0.49:0.03, handlings similar to those of Example 1 were carried out to obtain powders $A_3$. As the result of composition analysis of the powders $A_3$, the molar ratio of Li:Ni:Mn:Fe was 1.06:0.48:0.49:0.03. In addition, the BET specific surface area of the powders $A_3$ was 9 $m^2/g$, and in SEM observation of the powders $A_3$, the mean value of diameters of primary particles was 0.2 μm and the mean value of diameters of secondary particles was 0.5 μm. In addition, as the result of powder X-ray diffraction measurement, the crystal structure of the powders $A_3$ was found to be the crystal structure belonging to R-3m space group.

2. Discharge Rate Test and Cycle Test of Nonaqueous Electrolyte Secondary Battery By use of the powders $A_3$, a coin type cell was produced, and discharge rate test was carried out, and as the result thereof, the discharge capacities (mAh/g) in 0.2 C and 20 C were respectively 141 and 90, and 0.2 C discharge capacity ratio (%) was 64, which was high. In addition, cycle test of charge and discharge was carried out 20 times repeatedly, and as the result thereof, the discharge capacities (mAh/g) in the 1st cycle and the 20th cycle were respectively 152 and 145, and discharge capacity maintenance factor (%) was 95, which was high. The results of 60° C. discharge capacity maintenance factor and 0.2 C discharge capacity ratio are shown in Table 1.

Example 4

1. Production of Lithium Mixed Metal Oxide

Except that the molar ratio of Ni:Mn:Fe was adjusted so as to give 0.48:0.50:0.02, handlings similar to those of Example 1 were carried out to obtain powders $A_4$. As the result of composition analysis of the powders $A_4$, the molar ratio of Li:Ni:Mn:Fe was 1.09:0.48:0.50:0.02. In addition, the BET specific surface area of the powders $A_4$ was 12 m$^2$/g, and in SEM observation of the powders $A_4$, the mean value of diameters of primary particles was 0.1 μm and the mean value of diameters of secondary particles was 0.4 μm. In addition, as the result of powder X-ray diffraction measurement, the crystal structure of the powders $A_4$ was found to be the crystal structure belonging to R-3m space group.

2. Discharge Rate Test and Cycle Test of Nonaqueous Electrolyte Secondary Battery By use of the powders $A_4$, a coin type cell was produced, and discharge rate test was carried out, and as the result thereof, the discharge capacities (mAh/g) in 0.2 C and 20 C were respectively 141 and 91, and 0.2 C discharge capacity ratio (%) was 65, which was high. In addition, cycle test of charge and discharge was carried out 20 times repeatedly, and as the result thereof, the discharge capacities (mAh/g) in the 1st cycle and the 20th cycle were respectively 155 and 147, and discharge capacity maintenance factor (%) was 95, which was high. The results of 60° C. discharge capacity maintenance factor and 0.2 C discharge capacity ratio are shown in Table 1.

Example 5

1. Production of Lithium Mixed Metal Oxide

Except that the molar ratio of Ni:Mn:Fe was adjusted so as to give 0.48:0.52:0, handlings similar to those of Example 1 were carried out to obtain powders $A_5$. As the result of composition analysis of the powders $A_5$, the molar ratio of Li:Ni:Mn:Fe was 1.10:0.48:0.52:0. In addition, the BET specific surface area of the powders $A_5$ was 14 m$^2$/g, and in SEM observation of the powders $A_5$, the mean value of diameters of primary particles was 0.1 μm and the mean value of diameters of secondary particles was 0.4 μm. In addition, as the result of powder X-ray diffraction measurement, the crystal structure of the powders $A_5$ was found to be the crystal structure belonging to R-3m space group.

2. Discharge Rate Test and Cycle Test of Nonaqueous Electrolyte Secondary Battery By use of the powders $A_5$, a coin type cell was produced, and discharge rate test was carried out, and as the result thereof, the discharge capacities (mAh/g) in 0.2 C and 20 C were respectively 142 and 92, and 0.2 C discharge capacity ratio (%) was 65, which was high. In addition, cycle test of charge and discharge was carried out 20 times repeatedly, and as the result thereof, the discharge capacities (mAh/g) in the 1st cycle and the 20th cycle were respectively 157 and 148, and discharge capacity maintenance factor (%) was 94, which was high. The results of 60° C. discharge capacity maintenance factor and 0.2 C discharge capacity ratio are shown in Table 1.

Example 6

1. Production of Lithium Mixed Metal Oxide

Except that the calcination temperature of the material mixture was changed to 900° C., handlings similar to those of Example 5 were carried out to obtain powders $A_6$. As the result of composition analysis of the powders $A_6$, the molar ratio of Li:Ni:Mn:Fe was 1.09:0.48:0.52:0. In addition, the BET specific surface area of the powders $A_6$ was 3 m$^2$/g, and in SEM observation of the powders $A_6$, the mean value of diameters of primary particles was 0.5 μm and the mean value of diameters of secondary particles was 1.5 μm. In addition, as the result of powder X-ray diffraction measurement, the crystal structure of the powders $A_6$ was found to be the crystal structure belonging to R-3m space group.

2. Discharge Rate Test and Cycle Test of Nonaqueous Electrolyte Secondary Battery By use of the powders $A_6$, a coin type cell was produced, and discharge rate test was carried out, and as the result thereof, the discharge capacities (mAh/g) in 0.2 C and 20 C were respectively 142 and 89, and 0.2 C discharge capacity ratio (%) was 63, which was high. In addition, cycle test of charge and discharge was carried out 20 times repeatedly, and as the result thereof, the discharge capacities (mAh/g) in the 1st cycle and the 20th cycle were respectively 157 and 145, and discharge capacity maintenance factor (%) was 92, which was high. The results of 60° C. discharge capacity maintenance factor and 0.2 C discharge capacity ratio are shown in Table 1.

Example 7

1. Production of Lithium Mixed Metal Oxide

Except that the molar ratio of Ni:Mn:Fe was adjusted so as to give 0.475:0.475:0.05, handlings similar to those of Example 1 were carried out to obtain powders $A_7$. As the result of composition analysis of the powders $A_7$, the molar ratio of Li:Ni:Mn:Fe was 1.07:0.475:0.475:0.05. In addition, the BET specific surface area of the powders $A_7$ was 7 m$^2$/g, and in SEM observation of the powders $A_7$, the mean value of diameters of primary particles was 0.2 μm and the mean value of diameters of secondary particles was 0.4 μm. In addition, as the result of powder X-ray diffraction measurement, the crystal structure of the powders $A_7$ was found to be the crystal structure belonging to R-3m space group.

2. Discharge Rate Test and Cycle Test of Nonaqueous Electrolyte Secondary Battery By use of the powders $A_7$, a coin type cell was produced, and discharge rate test was carried out, and as the result thereof, the discharge capacities (mAh/g) in 0.2 C and 20 C were respectively 138 and 84, and 0.2 C discharge capacity ratio (%) was 61, which was high. In addition, cycle test of charge and discharge was carried out 20 times repeatedly, and as the result thereof, the discharge capacities (mAh/g) in the 1st cycle and the 20th cycle were respectively 154 and 143, and discharge capacity maintenance factor (%) was 93, which was high. The results of 60° C. discharge capacity maintenance factor and 0.2 C discharge capacity ratio are shown in Table 1.

Comparative Example 1

1. Production of Lithium Mixed Metal Oxide

Except that the molar ratio of Ni:Mn:Fe was adjusted so as to give 0.45:0.45:0.1, handlings similar to those of Example 1 were carried out to obtain powders $R_1$. As the result of composition analysis of the powders $R_1$, the molar ratio of Li:Ni:Mn:Fe was 1.21:0.45:0.45:0.1. In addition, the BET specific surface area of the powders $R_1$ was 5 m²/g, and in SEM observation of the powders $R_1$, the mean value of diameters of primary particles was 0.3 μm and the mean value of diameters of secondary particles was 1 μm. In addition, as the result of powder X-ray diffraction measurement, the crystal structure of the powders $R_1$ was found to be the crystal structure belonging to R-3m space group.

2. Discharge Rate Test and Cycle Test of Nonaqueous Electrolyte Secondary Battery By use of the powders $R_1$, a coin type cell was produced, and discharge rate test was carried out, and as the result thereof, the discharge capacities (mAh/g) in 0.2 C and 20 C were respectively 115 and 55, which were both lower than those of Example 1, and furthermore 0.2 C discharge capacity ratio (%) was 48, which was low. In addition, cycle test of charge and discharge was carried out 20 times repeatedly, and as the result thereof, the discharge capacities (mAh/g) in the 1st cycle and the 20th cycle were respectively 131 and 118, and discharge capacity maintenance factor (%) was 90, which was low. The results of 60° C. discharge capacity maintenance factor and 0.2 C discharge capacity ratio are shown in Table 1.

Comparative Example 2

1. Production of Lithium Mixed Metal Oxide

Except that checkweighing was carried out so that the molar ratio of Ni:Mn:Fe can be 0.5:0.5:0, handlings similar to those of Example 1 were carried out to obtain powders $R_3$. As the result of composition analysis of the powders $R_3$, the molar ratio of Li:Ni:Mn:Fe was 1.10:0.5:0.5:0. In addition, the BET specific surface area of the powders $R_3$ was 6 m²/g, and in SEM observation of the powders $R_3$, the mean value of diameters of primary particles was 0.2 μm and the mean value of diameters of secondary particles was 0.6 μm. In addition, as the result of powder X-ray diffraction measurement, the crystal structure of the powders $R_3$ was found to be the crystal structure belonging to R-3m space group.

2. Discharge Rate Test and Cycle Test of Nonaqueous Electrolyte Secondary Battery By use of the powders $R_3$, a coin type cell was produced, and discharge rate test was carried out, and as the result thereof, the discharge capacities (mAh/g) in 0.2 C and 20 C were respectively 144 and 79, and 0.2 C discharge capacity ratio (%) was 55, which was low. In addition, cycle test of charge and discharge was carried out 20 times repeatedly, and as the result thereof, the discharge capacities (mAh/g) in the 1st cycle and the 20th cycle were respectively 157 and 131, and discharge capacity maintenance factor (%) was 83, which was low. The results of 60° C. discharge capacity maintenance factor and 0.2 C discharge capacity ratio are shown in Table 1.

TABLE 1

|  | Li x | Mn 1 − y − z | Ni y | Fe Z | Mean value of diameters of primary particles μm | 60° C. discharge capacity maintenance factor 20th cycle/ 1st cycle (%) | Discharge rate test 20 C./0.2 C. (%) |
|---|---|---|---|---|---|---|---|
| Example 1 | 1.13 | 0.47 | 0.46 | 0.07 | 0.2 | 97 | 65 |
| Example 2 | 1.07 | 0.48 | 0.47 | 0.05 | 0.2 | 96 | 66 |
| Example 3 | 1.06 | 0.49 | 0.48 | 0.03 | 0.2 | 95 | 64 |
| Example 4 | 1.09 | 0.50 | 0.48 | 0.02 | 0.1 | 95 | 65 |
| Example 5 | 1.10 | 0.52 | 0.48 | 0 | 0.1 | 94 | 65 |
| Example 6 | 1.09 | 0.52 | 0.48 | 0 | 0.5 | 92 | 63 |
| Example 7 | 1.07 | 0.475 | 0.475 | 0.05 | 0.2 | 93 | 61 |
| Comparative Example 1 | 1.21 | 0.45 | 0.45 | 0.1 | 0.3 | 90 | 48 |
| Comparative Example 2 | 1.10 | 0.5 | 0.5 | 0 | 0.2 | 83 | 55 |

Production Example 1

Production of Laminated Film (1) Production of Liquid for Coating 272.7 g of calcium chloride was dissolved in 4200 g of NMP, and thereafter 132.9 g of para-phenylenediamine was added and completely dissolved therein. In the resultant solution, 243.3 g of terephthalic acid dichloride was gradually added to polymerize them and obtain a para-aramid, which was further diluted with NMP to obtain a para-aramid solution (A) having a concentration of 2.0 weight %. In 100 g of the resultant para-aramid solution, 2 g of alumina powders (a) (Alumina C manufactured by Nippon Aerosil K.K., mean particle diameter: 0.02 μm) and 2 g of alumina powders (b) (Sumicorundum AA03 manufactured by Sumitomo Chemical Co., Ltd., mean particle diameter: 0.3 μm) were added as a filler in a total mount of 4 g and mixed, and the mixture was treated with a Nanomizer three times and furthermore filtrated with a 1000 mesh wire fabric and defoamed under reduced pressure to produce a slurry for coating (B). The rate of the weight of alumina powders (filler) to the total weight of the para-aramid and alumina powders was 67 weight %.

(2) Production and Evaluation of Laminated Film

As a porous film, there was used a porous film made of polyethylene (film thickness: 12 μM, air permeability: 140 sec/100 cc, mean pore diameter: 0.1 μm, void content: 50%). The above porous film made of polyethylene was fixed on a PET film having a thickness of 100 μm, and the slurry for coating (B) was applied on the porous film by a bar coater manufactured by TESTER SANGYO CO., LTD. The applied porous film on the PET film as a unit was immersed in water as a poor solvent to deposit a para-aramid porous film (heat-resistant porous layer), and thereafter the solvents were dried to obtain a laminated film 1 that has the heat-resistant porous layer and the porous film laminated to each other. The thickness of the laminated film 1 was 16 μm, and the thickness of the para-aramid porous film (heat-resistant porous layer) was 4 μm. The air permeability of the laminated film 1 was 180 sec/100 cc, and its void content was 50%. The cross-section of the heat-resistant porous layer in the laminated film 1 was observed with a scanning electron microscope (SEM), and as the result thereof it was found that relatively small fine pores of about 0.03 μm to 0.06 μm and relatively large fine powders of about 0.1 μm to 1 μm were contained therein. In this connection, evaluation of the laminated film was carried out in accordance with the following methods.

<Evaluation of Laminated Film>

(A) Thickness Measurement

The thickness of the laminated film and the thickness of the porous film were measured in accordance with JIS K7130-1992. In this connection, as the thickness of the heat-resistant porous layer, there was used a value obtained by subtracting the thickness of the porous film from the thickness of the laminated film.

(B) Measurement of Air Permeability by Gurley Method

The air permeability of the laminated film was measured with a digital timer type Gurley densometer manufactured by YASUDA SEIKI SEISAKUSHO, LTD. on the basis of JIS P8117.

(C) Void Content

A sample of the resultant laminated film was cut off in the form of a square having a side of 10 cm, and the weight W (g) and thickness D (cm) thereof were measured. The weights (Wi (g)) of the respective layers in the sample were obtained, and the volumes of the respective layers were obtained from Wi and the true specific gravities (true specific gravity i (g/cm³)) of the materials of the respective layers, and then void content (volume %) was obtained in accordance with the following equality.

Void content (volume %)=100×{1−($W$1/true specific gravity 1+$W$2/true specific gravity 2+•••+$Wn$/true specific gravity $n$)/(10×10×$D$)}

The invention claimed is:

1. A lithium mixed metal oxide represented by the following formula (A):

$$Li_x(Mn_{1-y-z}Ni_yFe_z)O_2 \quad (A)$$

wherein x is a value in the range of not less than 0.9 and not more than 1.3, y is a value in the range of not less than 0.46 and less than 0.5, and z is a value in the range of not less than 0 and less than 0.1, wherein a mean value of particle diameters of lithium mixed metal oxide constituent primary particles is in the range of not less that 0.01 μm and not more than 0.5 μm, and wherein a mean value of particle diameters of lithium mixed metal oxide secondary particles is not less than 0.1 μm and not more than 3 μm.

2. The lithium mixed metal oxide according to claim 1, wherein the value of (1-y-z) is larger than that of y in said formula (A).

3. The lithium mixed metal oxide according to claim 1, wherein z is a value in the range of not less than 0.02 and not more than 0.07 in said formula (A).

4. A positive electrode active material comprising the lithium mixed metal oxide according to claim 1.

5. A positive electrode comprising the positive electrode active material according to claim 4.

6. A nonaqueous electrolyte secondary battery comprising the positive electrode according to claim 5.

7. The nonaqueous electrolyte secondary battery according to claim 6, which further comprises a separator.

8. The nonaqueous electrolyte secondary battery according to claim 7, wherein the separator is a separator comprising a laminated film which has a heat-resistant porous layer and a porous film laminated to each other.

9. A process for producing a lithium mixed metal oxide represented by the following formula (A):

$$Li_x(Mn_{1-y-z}Ni_yFe_z)O_2 \quad (A),$$

wherein x is a value in the range of not less than 0.9 and not more than 1.3, y is a value in the range of not less than 0.46 and less than 0.5, and z is a value in the range of not less than 0 and less than 0.1, which process comprises the following steps (1), (2) and (3) in this order:

(1) the step of bringing an aqueous solution containing Ni, Mn, Fe and Cl into contact with an alkali to obtain a coprecipitate slurry, (2) the step of obtaining a coprecipitate from the coprecipitate slurry, and (3) the step of obtaining the mixed metal oxide by subjecting a mixture obtained by mixing the coprecipitate, a lithium compound, and optionally an inactive flux to calcination by keeping the mixture at a temperature of less than 900° C.

* * * * *